United States Patent [19]
Trimmer

[11] Patent Number: 5,211,728
[45] Date of Patent: May 18, 1993

[54] CLAMSHELL RETAINER USED IN HOLLOW FIBER MEMBRANE DEVICES

[75] Inventor: Johnny L. Trimmer, Antioch, Calif.

[73] Assignee: The Dow Chemical Company, Midland, Mich.

[21] Appl. No.: 893,306

[22] Filed: Jun. 4, 1992

Related U.S. Application Data

[63] Continuation of Ser. No. 769,040, Sep. 30, 1991, abandoned.

[51] Int. Cl.$^5$ .................. B01D 53/22; B01D 63/02; B01D 69/04
[52] U.S. Cl. .................................. 55/16; 55/68; 55/158; 210/321.8; 210/321.89
[58] Field of Search .................. 55/16, 68, 158; 210/610, 321.78, 321.79, 321.8, 321.87, 321.88, 321.89, 500.23

[56] References Cited

U.S. PATENT DOCUMENTS

| | | | |
|---|---|---|---|
| 3,339,341 | 9/1967 | Maxwell et al. | 55/16 |
| 3,716,143 | 2/1973 | Clark | 210/321.87 |
| 3,722,694 | 3/1973 | Agranat | 210/321.89 |
| 3,722,695 | 3/1973 | Sargent et al. | 210/321.89 |
| 3,832,830 | 9/1974 | Gerow | 55/158 |
| 3,977,976 | 8/1976 | Spaan et al. | 210/321.78 |
| 4,237,596 | 12/1980 | Hughes et al. | 55/158 |
| 4,367,139 | 1/1983 | Graham | 210/321.1 |
| 4,378,981 | 4/1983 | Otstot et al. | 55/158 |
| 4,380,460 | 4/1983 | Otstot et al. | 55/158 |
| 4,451,369 | 5/1984 | Sekino et al. | 210/321.1 |
| 4,508,548 | 4/1985 | Manatt | 55/158 |
| 4,517,720 | 5/1985 | Otstot et al. | 55/158 |
| 4,565,630 | 1/1986 | Runkle | 210/321.89 |
| 4,578,190 | 3/1986 | Fowler | 210/321.89 |
| 4,676,808 | 6/1987 | Coplan | 55/158 |
| 4,690,758 | 9/1987 | Leonard et al. | 210/321.89 |
| 4,707,267 | 11/1987 | Johnson | 210/650 |
| 4,734,106 | 3/1988 | Gollan | 55/16 |
| 4,744,900 | 5/1988 | Bratt | 210/321.78 |
| 4,752,305 | 6/1988 | Johnson | 55/16 |
| 4,781,832 | 11/1988 | Takemura et al. | 210/321.8 |
| 4,781,834 | 11/1988 | Sekino et al. | 210/321.88 |
| 4,863,600 | 9/1989 | Leonard et al. | 210/321.89 |
| 4,871,379 | 10/1989 | Edwards | 55/158 |
| 4,929,259 | 5/1990 | Caskey et al. | 55/158 |
| 4,959,152 | 9/1990 | Nichols | 210/651 |
| 4,961,760 | 10/1990 | Caskey et al. | 55/158 |
| 5,013,331 | 5/1991 | Edwards et al. | 55/16 |
| 5,013,437 | 7/1991 | Trimmer et al. | 210/321.8 |
| 5,053,130 | 10/1991 | Raff et al. | 55/158 |

FOREIGN PATENT DOCUMENTS 2052301A 1/1981 United Kingdom ............ 210/321.8

*Primary Examiner*—Robert Spitzer
*Attorney, Agent, or Firm*—Janet Pauline Clark

[57] ABSTRACT

The invention relates to a hollow fiber membrane device having a hollow fiber membrane bundle with tubesheets, separable end caps, clamshell-shaped retainers for joining the end caps to the tubesheets, associated circumferential keepers which positionally constrain the clamshell-shaped retainers, and an optional envelope which encloses the membrane bundle.

36 Claims, 6 Drawing Sheets

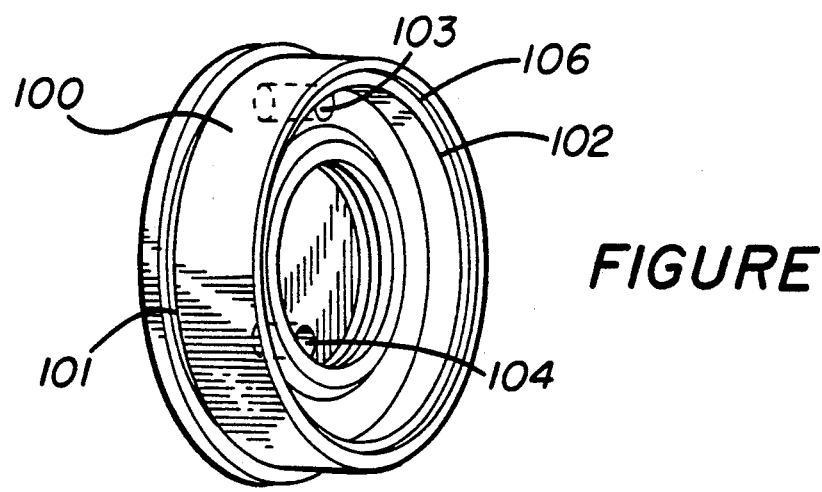
FIGURE 1
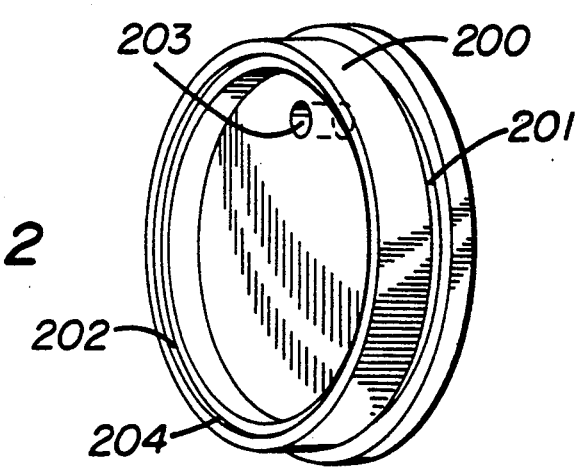
FIGURE 2
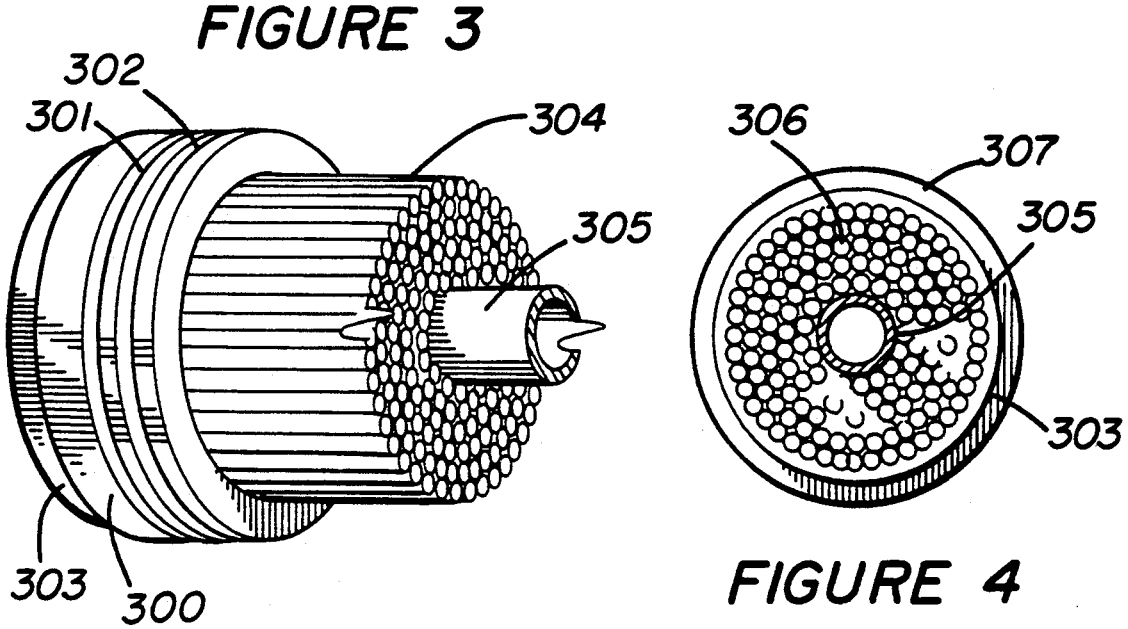
FIGURE 3
FIGURE 4

CLAMSHELL RETAINER USED IN HOLLOW FIBER MEMBRANE DEVICES

CROSS-REFERENCE TO RELATED APPLICATION

This is a continuation of application Ser. No. 07/769,040 filed Sep. 30, 1991, now abandoned.

BACKGROUND OF THE INVENTION

This invention relates to a membrane separation device. More particularly, it relates to a means for attaching an end cap to the tubesheet of a hollow fiber membrane separation module or a means for attaching the tubesheet of one hollow fiber module to the tubesheet of another hollow fiber module. In another aspect, this invention relates to a membrane separation device comprising a hollow fiber membrane bundle and tubesheets, end caps, clamshell retainer means, circumferential keeper means, and optionally a hollow envelope enclosing the membrane separation module. This invention also relates to a method of separating gas compositions using such a membrane separation device.

Hollow fiber membrane separation modules generally consist of a hollow fiber membrane bundle formed from a plurality of hollow fiber membranes arranged about a core or mandrel and held together in place by tubesheets. The modules typically are enclosed in a pressure vessel having a cylindrical tube and end caps which contains all the components of the module. End caps of appropriate dimensions and with appropriate fluid connection ports are typically threaded into or onto the cylindrical tube portion of the pressure vessel. Alternatively, the cylindrical tube portion of the pressure vessel may be flanged in such a fashion so as to mate with a similarly flanged end cap bolted or screwed thereto. The pressure vessel supports the module, protects module components, defines fluid flow regions in conjunction with other module components, and protects operators from possible failure of module components. Conventional pressure vessels usually add a significant amount to the cost of membrane devices since such vessels must be large enough to accommodate the entire module and strong enough to withstand the pressures commonly employed. Such pressure vessels are also generally machined to close tolerances from high strength and corrosion resistant materials.

What is needed is a means of attaching an end cap to the tubesheet of a hollow fiber membrane module, or for attaching the tubesheet of one hollow fiber membrane module to the tubesheet of another hollow fiber membrane module, which is efficiently and easily assembled, without the aid of special tools. What is further needed is a more cost effective means of housing a hollow fiber membrane separation module. What is also needed is an assembled device which is more compact and less bulky and weighs less than conventional devices.

SUMMARY OF THE INVENTION

The invention is a means for attaching an end cap to a tubesheet of a hollow fiber membrane separation module, the tubesheet having an inner face intersected by a plurality of hollow fiber membranes and an outer face, the end cap and the tubesheet having mating peripheral surfaces and the end cap and tubesheet each having an outer peripheral surface, comprising a peripheral circumferential groove in the outer surface of each of the end cap and tubesheet, the groove in the outer surface of the tubesheet being adjacent to the inner face thereof; a clamshell retainer means for each adjacent end cap and associated tubesheet in the form of a segmented collar with a plurality of curved segments, the segments together forming a substantially complete cylindrical collar with flange portions adjacent to both edges thereof, the flange portions on each segment extending radially inwardly, and the flange portions of each segment being adapted to fit matingly, respectively, and coordinately into the peripheral groove pair of respective end cap and associated tubesheet, the spacing between the flanges being such as to urge each end cap and associated tubesheet snugly together in a sealing relationship, and a circumferential keeper means closely surrounding each clamshell retainer means to hold the flanges of the clamshell retainer means in the respective grooves in each end cap and associated tubesheet. In another embodiment, the invention is a means of attaching a tubesheet of a second hollow fiber membrane module to a tubesheet of a first hollow fiber membrane module. In such an embodiment, the first and second hollow fiber membrane modules are attached end to end via the clamshell retainer means and the keeper means. The tubesheet of the second hollow fiber membrane module which is attached to the tubesheet of the first hollow fiber membrane module thus stands in place of, and functions similarly to, the end cap used for a single hollow fiber membrane device.

In another aspect, the invention is also a housing for a hollow fiber membrane separation module having a plurality of hollow fiber membranes formed into a bundle with tubesheets, one on each end of the bundle, each tubesheet having a circumferential groove in the radially outward surface, an inner face intersected by the hollow fiber membranes and an outer face, the hollow fiber membranes being sealingly secured at each end in the respective tubesheet and communicating therethrough, comprising: first and second end caps, each having a radially outward surface and an inner face with a peripheral flange, said flange being positioned and adapted to sealingly mate against the complementary peripheral surface on the outer radial face of an adjacent respective tubesheet, each flange having sufficient width in the axial direction to provide an enclosed space between the inner face of said end cap and the outer face of the adjacent tubesheet, the space serving as a fluid inlet or outlet region and each end cap having a circumferential groove in the radially outward surface of each end cap; a clamshell retainer means for each adjacent end cap and associated tubesheet, said clamshell retainer means having the configuration of a segmented collar with a plurality of segments, the segments together forming the collar with flange portions on each segment extending radially inwardly, the flange portions of each segment being adapted to fit matingly, respectively, and coordinately into the peripheral groove pair of each respective end cap and associated tubesheet, the spacing between the flanges being such as to urge each end cap and associated tubesheet snugly together in a sealing relationship. Alternatively, the flange portions are located in some position along the inner surface of the cylindrical collar which is not described as peripheral, and the inner axial surfaces formed thereby provide additional support and facilitate the removal of the clamshell retainer. In some embodiments, the segmented clamshell retainer means is comprised of two or more contiguous or non-contiguous segments. The device also comprises a circumferential keeper means which closely surrounds each clamshell retainer means and holds the flanges of the clamshell retainer means in respective grooves in each end cap and associated tubesheet. Alternatively, the circumferential keeper means is comprised of a clamp of adjustable sizing or a multiple part such as a two-part or 4-part cylindrical keeper, joined along one axial edge by means of a hinge and joined along the other edge by a clamping means. In some embodiments, the circumferential keeper means is comprised of two cylindrical sections, joined along both axial edges by a clamping means. The housing also optionally comprises a hollow envelope enclosing said hollow fiber membrane bundle, said envelope having ends which are fitted sealingly against each respective tubesheet to provide an enclosed space around the hollow fiber membrane bundle; respective ports extend through each end cap and through said keeper means and said hollow envelope to provide fluid communication into and out of the separation device. In an alternative embodiment, the hollow envelope serves as the circumferential keeper means, enclosing said hollow fiber membrane bundle, tubesheets, end caps, and clamshell retainer means. In some cases, it is desirable to modify some of the surfaces of certain components such as the peripheral edges of the clamshell retainer means and the inner edges of the circumferential keeper means by chamfering so that surfaces the will more easily fit into or onto other complementary surfaces. It is occasionally desirable to modify the end cap, clamshell retainer means, circumferential keeper means, and/or hollow envelope so as to provide a means of indexing and aligning said clamshell retainer means, circumferential keeper means, and/or hollow envelope with said end cap. The aligned position may be maintained by the use of a pin, cap screw, set screw, or the like.

Included within the scope of this invention is also a process for separating a feed gas mixture using a membrane separation device containing a plurality of hollow fiber semi-permeable gas separation membranes, comprising: contacting one side of the membranes with a feed gas mixture under pressure; maintainig a pressure differential across the membranes under conditions such that a least one gaseous component in the feed gas mixture selectively permeates through the membranes from the higher pressure side to the lower pressure side of the membranes; removing from the lower pressure side of the membranes permeated gas which is enriched in at least one selectively permeating gaseous component; and removing from the higher pressure side of the membranes non-permeated gas which is depleted in at least one selectively permeating gaseous component, wherein said device is as described hereinabove.

The apparatus and process of the invention are of advantage because of the low cost, reliability, compactness, reduced weight, and sturdiness of the equipment and ease of properly assembling the components of the device, and its efficiency and reliability of use.

BRIEF DESCRIPTION OF THE DRAWINGS

FIG. 1 is a perspective view of a two-stage concentric module feed end cap according to the invention with circumferential groove and respective fluid ports extending between the inner and outer faces of the end cap.

FIG. 2 is a perspective view of a non-feed end cap or a single-stage module feed end cap with a circumferential groove and a fluid port extending between the inner and outer faces of the end cap.

FIG. 3 is a fragmentary perspective view of a hollow fiber membrane bundle with a tubesheet at the end shown, the tubesheet having a peripheral groove according to the invention.

FIG. 4 is an end view of a hollow fiber membrane tubesheet with appropriate sealing surfaces on the end face that mates with an end cap in the assemblies according to the invention.

FIG. 9 is a fragmentary perspective view of a hollow fiber membrane bundle with a tubesheet, end cap and clamshell retainer means, surrounded by a hose clamp-type keeper means.

FIG. 10 is a fragmentary perspective view similar to FIG. 9, but with an exploded view as to the clamshell retainer means and a bolted split-ring keeper means.

DETAILED DESCRIPTION OF THE INVENTION

Figure 5:
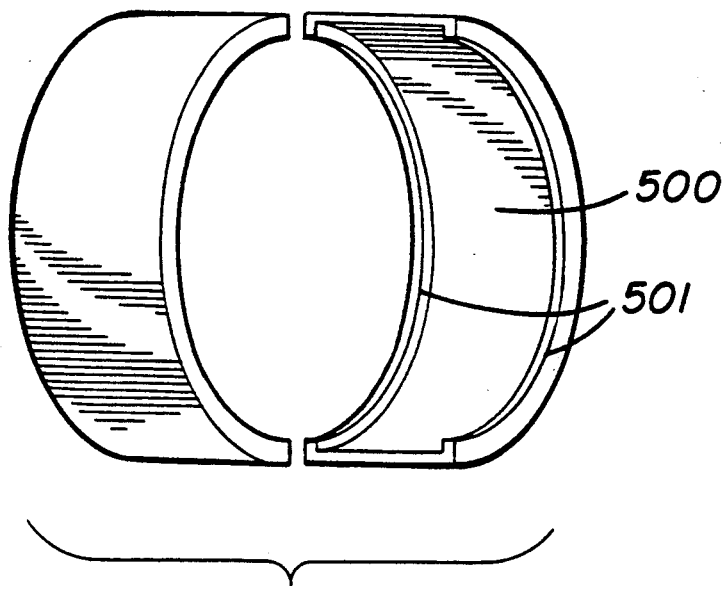
FIG. 5 is a perspective view of a collar-like two-part segmented clamshell retainer means with radially inwardly extending flanges that fit into peripheral grooves in attaching an end cap to a tubesheet as herein described.

This invention relates to devices for separating one or more fluids from one or more other fluids in a fluid mixture, in which the separation is performed by selectively transporting one or more fluids across a membrane. In this invention, the membranes utilized in said devices are in hollow fiber form. In another aspect, the invention is a housing for a hollow fiber membrane separation module. In still another aspect, the invention is a means for attaching an end cap or a tubesheet of a second hollow fiber membrane separation module to a tubesheet of a first hollow fiber separation module.

The hollow fiber membrane devices of this invention can be used to separate one or more fluids from one or more other fluids in a fluid mixture, wherein the fluids possess different transport rates through or across the membranes. The fluids may be in gas, vapor, or liquid state.

In one preferred embodiment, the hollow fiber membrane devices of this invention are useful in separating one or more gases from one or more other gases in a feed gas mixture. The mixture of gases to be separated preferably comprises at least one of the gases selected from the group consisting of hydrogen, helium, oxygen, nitrogen, carbon monoxide, carbon dioxide, hydrogen sulfide, water vapor, ammonia, methane, other light hydrocarbons, and the like. Light hydrocarbons as used herein means saturated and unsaturated $C_{1-4}$ hydrocarbons. Examples of such gases being separated are hydrogen and/or helium from light hydrocarbons, oxygen from nitrogen, nitrogen from methane, carbon monoxide and/or carbon dioxide from light hydrocarbons, hydrocarbons from hydrocarbons, and the like.

In another preferred embodiment, the fluids to be separated are liquids. In one preferred embodiment wherein the fluids to be separated are liquids, the material is transported through or across the membrane as a gas or vapor. The material permeating through or across the membrane as a gas or vapor may be removed from the device as a gas or vapor, or condensed and removed from the device as a liquid. This separation may be referred to as membrane stripping, membrane distillation, or pervaporation. In membrane stripping, a microporous membrane is used and the material permeating through or across the membrane is removed from the device as a gas or vapor. In membrane distillation, a microporous membrane is used and the material permeating through or across the membrane is condensed and removed from the device as a liquid. In pervaporation, a non-microporous membrane, that is, a membrane possessing a dense discriminating layer or region, is used and the material permeating through or across the membrane may be removed as a gas or vapor or condensed and removed from the device as a liquid. In these embodiments, volatile compounds, that is, those with relatively higher vapor pressures under the separation conditions, are separated from compounds with relatively lower vapor pressures. Examples of volatile compounds which may be removed from liquid mixtures include $C_{1-10}$ aliphatic and aromatic halogenated hydrocarbons such as dichloromethane (methylene chloride), dibromomethane (methylene bromide), trichloromethane (chloroform), tribromomethane (bromoform), carbon tetrachloride, 1,1-dichloroethane, 1,2-dichloroethane, 1,1,1-trichloroethane, 1,1,2-trichloroethane, trichloroethylene, tetrachloroethylene (perchloroethylene), 1,2-dichloropropane, chlorobenzene, dichlorobenzene, trichlorobenzene, and hexachlorobenzene; $C_{1-10}$ aliphatic and aromatic hydrocarbons such as methane, ethane, propane, butane, hexane, heptane, octane, ethylene, propylene, butylene, benzene, toluene, and xylene; $C_{1-10}$ aliphatic and aromatic alcohols such as methanol, ethanol, propanol, butanol, pentanol, hexanol, and phenol; $C_{1-8}$ ketones such as acetone, methylethylketone, methylisobutylketone, pentanone, and hexanone; $C_{1-8}$ ethers such as bis(2-chloroethyl)ether; $C_{1-8}$ amines such as methylamine, dimethylamine, trimethylamine, ethylamine, diethylamine, triethylamine, ethylenediamine, and aniline; and the like. Less volatile liquids from which the volatile compounds may be removed include water and mixtures of water and organics. In another preferred embodiment, gases entrained or dissolved in a liquid may be removed from such liquids. Examples of such entrained or dissolved gases include oxygen, carbon monoxide, carbon dioxide, sulfur dioxide, hydrogen sulfide, ammonia, and the like.

In some embodiments, a sweep fluid may be employed. In the embodiment wherein a sweep fluid is used, the sweep fluid may be any fluid which aids in the removal of the permeate fluid from the shellside of the membrane device. The sweep fluid may be a liquid, vapor, or gas. In gas separation or membrane stripping separation, the sweep fluid is preferably a gas or vapor. Preferred sweep gases include air, nitrogen, and the like.

The hollow fiber membranes are generally formed from a polymer which is capable of separating one or more fluids from one or more other fluids in a fluid mixture. The hollow fiber membranes may be prepared by melt spinning, wet spinning, dry spinning, or a combination thereof. The polymer which may be used to prepare the hollow fiber membranes preferably include olefinic polymers, such as poly-4-methylpentene, polyethylene, polypropylene, and fluorinated polyethylene; polytetrafluoroethylene; cellulosic esters, cellulose ethers, and regenerated cellulose; polyamides; polyetherketones, including polyetheretherketones and polyetherketoneketones; polyestercarbonates; polycarbonates; polyesters; polyarylates; polyethers; polybenzoxazoles; polyoxadiazoles; polytriazoles; polycranoarylethers; polyamideimides; polythioethers; polystyrenes; polysulfones; polyimides; polyetherimides; polyethersulfones; and copolymers and physical blends thereof.

The hollow fiber membranes may be homogeneous, symmetric (isotropic), asymmetric (anisotropic), or composite membranes. The membranes may have a dense discriminating region which separates one or more fluids from one or more other fluids based on differences in solubility and diffusivity of the fluids in the dense region of the membrane. Alternatively, the membranes may be microporous and separate one or more fluids from one or more other fluids based on relative volatilities of the fluids.

Hollow fiber membranes with dense regions are preferred for gas separations. Asymmetric hollow fiber membranes may have the discriminating region either on the outside of the hollow fiber, at the inside lumen surface of the hollow fiber, or located somewhere internal to both outside and inside hollow fiber membrane surfaces. In the embodiment wherein the discriminating region of the hollow fiber membrane is internal to both hollow fiber membrane surfaces, the inside lumen surface and the outside surface of the hollow fiber membrane are porous, yet the membrane demonstrates the ability to separate gases. In the embodiment wherein gases are separated, preferred polymers for membranes include polyestercarbonates, polysulfones, polyethersulfones, polyimides, polyethers, polyesters, polyarylates, polybenzoxazoles, polydiazoles, polytriazoles, polycyanoarylethers, polyamideimides, polyetherimides, polythioethers, polycarbonates, and copolymers and physical blends thereof. More preferred polymers for gas separation membranes include polysulfones, polyethersulfones, polyimides, polyesters, polycarbonates, and polyestercarbonates. A preferred class of polymers useful as gas separation membranes include ring- or bridge-substituted bisphenol based polysulfones, polyethersulfones, polyimides, polyesters, polyestercarbonates, and polycarbonates, wherein the substituents preferably are $C_{1-4}$ alkyl substituents or halo-substituents, more preferably halo-substituents such as chloro-, bromo-, and fluoro-substituents. Preferred polycarbonate, polyester, and polyestercarbonate membranes for gas separation include those described in U.S. Pat. Nos. 4,955,993, 4,874,401, 4,851,014, 4,840,646, and 4,818,254; the relevant portions of each patent incorporated herein by reference for all legal purposes which may be served thereby. In one preferred embodiment, such membranes are prepared by the process described in U.S. Pat. No. 4,772,392, the relevant portions incorporated herein by reference for all legal purposes which may be served thereby.

Microporous membranes are preferred for liquid separations such as membrane stripping and membrane distillation. Such microporous membranes may be symmetric (isotropic) or asymmetric (anisotropic). In the embodiment wherein liquids are separated, preferred polymers for membranes include polyolefins or fluorinated polyolefins, such as polyethylene, polypropylene, poly-4-methylpentene, and fluorinated polyethylene; polytetrafluoroethylene; polystyrenes; polyetherketones including polyetheretherketones and polyetherketoneketones; and copolymers and physical blends thereof. The methods for preparing such hollow fiber membranes are well known in the art. See, for example, U.S. Pat. Nos. 4,927,535, 4,904,426, and 4,115,492; the relevant portions of each patent incorporated herein by reference for all legal purposes which may be served thereby.

The hollow fiber membranes useful in the devices of this invention preferably possess an outer diameter in the range of from about 50 microns to about 400 microns, more preferably in the range of from about 75 microns to about 250 microns. The ratio of outside to inside diameter of such membranes is preferably between about 1.15 and about 2.50, more preferably between about 1.25 and about 1.70. In the case of asymmetric or composite membranes, the discriminating layer is preferably less than about 1 microns, more preferably less than about 0.5 microns. The discriminating layer in asymmetric or composite membranes may be on the outside or the inside of the hollow fiber membranes.

The membranes useful in this invention preferably possess a gas separation factor at about 30° C. for helium/methane of at least about 50, more preferably of at least about 95. The membranes of this invention preferably possess a gas separation factor at about 30° C. for helium/ethane of at least about 80, more preferably of at least about 150. The membranes of this invention preferably possess a gas separation factor at about 30° C. for helium/ethylene of at least about 75, more preferably of at least about 125. The membranes of this invention preferably possess a gas permeability for helium of at least about 5.0 Barrers, more preferably of at least about 15 Barrers.

The membranes of this invention preferably possess a gas separation factor for oxygen/nitrogen at about 30° C. of at least about 3.0, more preferably of at least about 4.0, even more preferably of at least about 5.0. The membranes of this invention preferably possess a gas permeability for oxygen of at least about 0.5 Barrers, more preferably of at least about 2.5 Barrers, even more preferably of at least about 4.0 Barrers.

The hollow fiber membranes are arranged in a bundle which comprises a plurality of the hollow fiber membranes. Such a bundle may take various shapes and possess various fiber wrapping patterns. Bundles of hollow fiber membranes useful in this invention may comprises various shapes and fiber arrangements, including those disclosed in U.S. Pat. Nos. 3,422,008 and 3,228,876; the relevant portions of each patent incorporated herein by reference for all legal purposes which may be served thereby. Preferably the bundle is arranged in an organized, that is, substantially non-random, fashion. In one preferred embodiment, the hollow fiber membrane bundle is arranged in a cylindrical fashion with the ends of the hollow fibers located at each end of the cylindrical bundle. Such a bundle is preferably an elongated bundle with the length being greater than the diameter. Preferably, the hollow fibers in the bundle are arranged in either a parallel wrap fashion or in a bias wrap fashion. In parallel wrapping, the hollow fibers lie substantially parallel to one another with each end of the hollow fibers located at each end of the bundle. In bias wrapping, the hollow fibers are wrapped in a crisscross pattern at a set angle, thus holding the hollow fibers in place in a bundle. Permeable cloth wraps such as DYNEL TM polyester cloth may be used to help hold the bundle together. Impermeable wraps may also be incorporated into the bundle to promote desired flow patterns, such as described in U.S. Pat. Nos. 4,929,259 and 4,961,760, the relevant portions incorporated herein by reference for all legal purposes served thereby. The bundle may also be fabricated into concentric sections for multiple stage operation or to provide variable flow capability such as described respectively in U.S. Pat. Nos. 5,013,437 and 5,013,331, the relevant portions incorporated herein by reference for all legal purposes served thereby.

About each end of the hollow fiber bundle is a tubesheet. The tubesheet functions to hold the hollow fiber membranes in place in a bundle and to separate the membrane device into different fluid regions. Such regions include the feed inlet region, wherein the fluid mixture to be separated is introduced into the device, and a non-permeate outlet region, wherein the fluid which does not permeate, that is, the non-permeate, across the membranes is removed from the device.

The tubesheets may be comprised of a thermoset or thermoplastic resinous material. Such resinous material should be capable of forming a fluid-tight seal around the hollow fiber membranes. In some embodiments, it is preferable that such resinous material be capable of bonding to the core and/or housing as well as the hollow fiber membranes. The hollow fiber membranes in the bundle communicate through each tubesheet, and the exterior face of each tubesheet opposite the bundle is opened such that the bores of the hollow fiber membranes are opened to the region adjacent to each tubesheet face, thereby allowing communication of fluid from such regions into and out of the hollow fiber membranes. The majority of each tubesheet comprises a composite of the hollow fiber membranes embedded in the resinous material. The tubesheets may be any shape which performs the functions hereinbefore described. Preferably, the tubesheets are substantially circular with sufficient cross-sectional area and thickness to provide support for the hollow fiber membranes and to withstand the pressures exerted on the tubesheets during operation. The portion of each tubesheet outside of the bundle may be built up for various purposes depending upon the design of the housing. These portions of the tubesheets may comprise solely resin or resin impregnated cloth which is wrapped around the outer portion of each tubesheet or the like.

Examples of such materials useful as resinous materials for tubesheets include artificial and natural rubbers, phenolaldehydes, acrylic resins, polysiloxanes, polyurethanes, fluorocarbons, and epoxy resins.

In the embodiment wherein the device is used for gas separations, the tubesheets are preferably prepared from epoxy resins. Any epoxy resin which adheres to the hollow fiber membranes and provides stability once cured can be used in this invention. Polyepoxide resins which are desirable for the resin formulations useful in this invention include glycidyl polyethers of polyhydric phenols.

Illustrative of the polyhydric phenols are mononuclear phenols and polynuclear phenols, and included within the latter are the phenol-aldehyde condensation resins commonly known as novolac resins. Typical mononuclear phenols include resorcinol, catechol, hydroquinone, phloroglucinol and the like. Examples of polynuclear phenols include 2,2 bis(4-hydroxyphenyl)propane(bisphenol A), 4,4'-dihydroxybenzophenone, 1,1-bis(4-hydroxyphenyl)ethane, bis(2-hydroxynaphthyl)methane, 2,2-bis(4-hydroxyphenyl)butane, 4,4'-dihydroxyphenyl phenyl sulfone, and the like.

The preparation of such epoxy resins is well known and is described in a number of patents such as U.S. Pat. No. 2,935,488 and in textbooks such as Lee and Neville, *Handbook of Epoxy Resins*, McGraw-Hill Book Co., 1967, the relevant portions of each reference incorporated herein by reference for all legal purposes which may be served thereby.

Preferred epoxy resins are those resins derived from bisphenol A, e.g., diglycidyl ethers of bisphenol A. Such preferred resins generally correspond to the formula:

nodiphenylsulfone, 4-chlorophenylenediamine, and the like.

Typical aliphatic amines include aminoethylethanolamine, polymethylenediamines, polyetherdiamines, diaminocyclohexane, and the like.

Other classes of compounds useful as epoxy curing agents include acid anhydride compounds, such as nadic methylanhydride, methyltetrahydrophthalicanhydride, succinic anhydride, and the like. Generally, acid anhydride curing agents require use of a catalyst to promote curing at temperatures lower than about 100° C. Such catalysts are generally used in catalytic amounts, that is, amounts sufficient to enhance the curing of the epoxy resin with the curing agent. Preferably, the catalyst is present in an amount of between about 0.5 and about 10 parts of catalyst per hundred of resin, more preferably between about 0.5 and about 4 parts of catalyst per hundred parts of resin, and most preferably between about 1 and about 2 parts of catalyst per hundred parts of resin. Preferred catalysts include tertiary amines, for example, benzyl-dimethylamine, N,N,N',N'-tetramethylbutanediamine, dimethylaminopropylamine, N-methylmorpholine, N-tri-ethylenediamine, and the like. Generally, where the curing agent is amine based, a catalyst is not necessary.

An additional optional component of curing agents for epoxy resins is a component which functions as a plasticizer for the cured resin, and which lowers the viscosity of the resin prior to the gellation of the resin. Such components as dioctylphthlate, dibutylphthlate, acetyltributylcitrate, or low molecular weight polyglycols, such as PEG 2000 manufactured by The Dow Chemical Company, are useful for this purpose.

The curing of epoxy resins is described in a number of textbooks, such as Lee and Neville, *Handbook of Epoxy Resins*, McGraw-Hill Book Co., 1967, the relevant portions incorporated herein by reference for all legal purposes which may be served thereby.

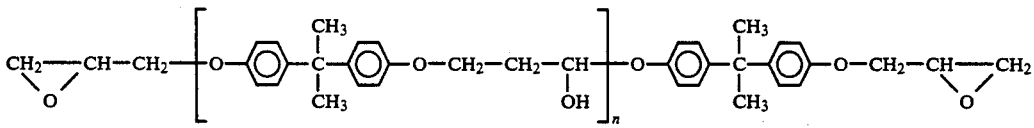

wherein n is a positive real number of between about zero and about 6, more preferably between about zero and about 4, more preferably between about zero and about 1.5.

In the discussion hereinafter, all parts with respect to the resin formulations will be based on 100 parts by weight of the epoxy resin (parts per hundred parts of resin, phr).

Epoxy resins preferred for use in this invention include D.E.R. ® epoxy resins, available from The Dow Chemical Company.

The epoxy resin is cured with a curing agent known to those skilled in the art. Typical curing agents include aliphatic as well as aromatic polyfunctional amines, both as purified compounds or as mixtures or blends with other compounds including those prepared as proprietary formulations by a number of different suppliers, such as Pacific Anchor Chemical Corporation.

Typical aromatic amines include m-phenylene-diamine, methylenedianiline, mixtures (including adducts) of m-phenylenediamine and methylenedianiline, diami- In the embodiment wherein the device of the invention is used for membrane stripping, membrane distillation, or pervaporation, the tubesheets preferably comprise the epoxy resins hereinbefore described or polyurethanes.

Figure 11:
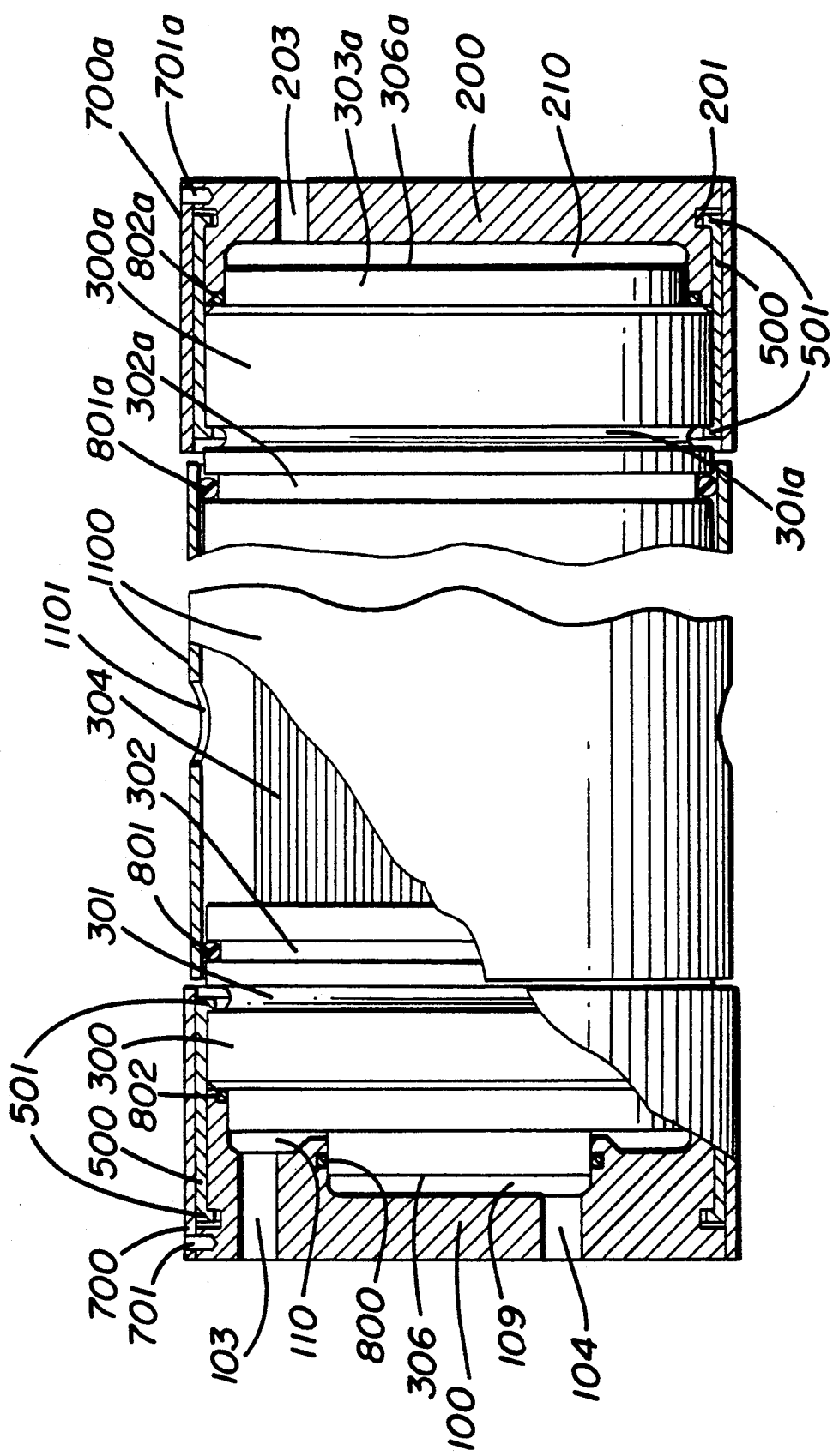
FIG. 11 is a side view partially broken away and in section of a two-stage concentric hollow fiber membrane separation device comprising end caps, tubesheets, hollow fiber membrane bundle, clamshell retainer means, circumferential keeper means, and a hollow envelope around the hollow fiber membrane/module according to the invention.

With reference to the drawings, particularly FIG. 11, devices of the invention may be assembled as follows. For example, a two-stage concentric hollow fiber membrane bundle 304, having appropriately modified and configured feed and non-feed tubesheets 300 and 300a, is fitted with sealing means such as O-rings 801 and 801a inserted into grooves 302 and 302a; a hollow envelope of appropriate dimensions is smoothly moved into position so as to sealingly engage both O-rings. Sealing means such as O-rings 802 and 802a are carefully positioned onto the circumferential surfaces of the feed and non-feed tubesheets 300 and 300a and O-ring 800 is likewise carefully positioned in the inner surface of the feed end cap 100; the feed and non-feed end caps 100 and 200, one at a time, are carefully advanced onto the tubesheet, rotating as necessary until the visible gap between the tubesheet and the end cap is minimized. A single segment of the collar-like clamshell retainer means 500 is placed appropriately in position so that the inwardly extending flanges can engage the circumferential grooves. The feed end cap 100 is compressed against the tubesheet 300 while the flanges of the single segment of the clamshell retainer means are inserted into the appropriate grooves. The second segment of the clamshell retainer means is fitted into position in the same fashion. The same procedure is used to position and insert the collar-like clamshell retainer means used to hold the non-feed end cap 200 in the appropriate position. A first circumferential keeper means 700, having peripheral interior edges which have been optionally chamfered, is advanced into position around the retainer means, rotated to align and fixed into position by the insertion of a cap screw in cavity 701. A second circumferential keeper means 701a of the same proportions and description is advanced into position around the retainer means engaging the non-feed end cap 200 and tubesheet 300a; the keeper means is similarly rotated and fixed into position by the insertion of a cap screw into cavity 701a. A feed pipe is threaded into communication port 103. A permeate pipe is attached to the communication port 1101. A non-permeate pipe is threaded into communication port 104 and communication port 203 is plugged. (In the embodiment where a conventional single-stage hollow fiber membrane module is inserted into the housing, communication port 203 is used to withdraw non-permeate and only a single feed communication port is generally used at the feed end of the module.)

The hollow fiber membrane bundle with tubesheets is sealingly mounted within the housing so as to define two fluid regions, wherein fluid flow between the two regions is accomplished by fluid permeating through the membranes. The membranes, tubesheets, and housing divide the device into a higher pressure side into which the feed gas mixture is introduced and a lower pressure side. The higher pressure feed side of the membranes is contacted with the feed gas under pressure, while a pressure differential is maintained across the membranes. The feed gas mixture may be introduced on the outside or on the inside, preferably on the inside, of the hollow fiber membranes. At least one gaseous component in the feed gas mixture selectively permeates through the membranes more rapidly than the other gaseous component or components in the feed gas mixture. Gas which is enriched in the selectively permeating component or components is thus obtained on the lower pressure side of the membranes as permeate. Gas depleted in the selectively permeating gaseous component or components is obtained on the higher pressure side of the membranes which is removed from the higher pressure side of the membranes as non-permeate. The permeate and non-permeate are removed from the device via appropriately located ports or openings in the housing, that is, in the end caps or hollow envelope.

Gas permeability is defined as $$P = \frac{(\text{amount of permeant}) (\text{membrane thickness})}{(\text{area}) (\text{time}) (\text{driving force across the membrane})}.$$

A standard permeability measurement unit is the Barrer (Ba), which is equal to $$10^{-10} \frac{(\text{centimeter})^3 (\text{STP}) (\text{centimeter})}{(\text{centimeter})^2 (\text{second}) (\text{centimeter Hg})},$$

abbreviated hereinafter as $$10^{-10} \frac{\text{cm}^3 (\text{STP}) \text{ cm}}{\text{cm}^2 \text{s cmHg}}.$$

The reduced gas flux is defined as (permeability)÷(membrane thickness). A standard reduced flux unit is $$10^{-6} \frac{(\text{centimeter})^3 (\text{STP})}{(\text{centometer})^2 (\text{second}) (\text{centimeter Hg})},$$

abbreviated hereinafter as $$10^{-6} \frac{\text{cm}^3 (\text{STP})}{\text{cm}^2 \text{s cmHg}}.$$

Alpha, the gas separation factor or gas selectivity, is defined as the ratio of the permeability or flux of the faster permeating gas to the permeability or flux of the slower permeating gas.

Recovery is defined as the ratio of the product gas flow rate to the feed gas flow rate, and is generally defined at a given temperature and composition of non-permeate.

The gas separation process is carried out at pressures and temperatures which do not deleteriously affect the membranes. Preferably, the pressure on the higher pressure side of the membranes is between about 10 psig (68.95 kPa) and about 2000 psig (13,790 kPa), more preferably between about 50 psig (344.7 kPa) and about 1000 psig (6895 kPa). The temperature of the feed gas mixture is preferably between about 0° C. and about 150° C., more preferably between about 10° C. and about 120° C. The temperature of the membranes is preferably between about 0° C. and about 150° C., more preferably between about 10° C. and about 120° C.

The membrane gas separation process of this invention may be combined with non-membrane gas separation processes such as cryogenic distillation and pressure swing adsorption. The devices of this invention may be operated in series or parallel. Operation may optionally include recycle of at least a portion of the permeate and/or non-permeate.

DETAILED DESCRIPTION OF THE DRAWINGS

The invention will be more specifically described hereinbelow with reference to the accompanying drawings.

In FIG. 1 showing a perspective view of a feed end cap portion of this invention for a two-stage concentric hollow fiber module, 100 is a feed end cap body having a radially outward surface, 101 is a circumferential groove formed in the radially outward surface of the end cap, 102 is an indented circumferential surface which will accommodate a sealing means such as an O-ring or gasket, 106 is a peripheral flange, the flange being positioned and adapted to mate against a complementary peripheral surface on the outer face of an adjacent tubesheet, and 103 and 104 are the fluid communication ports.

In FIG. 2 showing a perspective view of a non-feed end cap or a single-stage module feed end cap, 200 is an end cap body having a radially outward surface, 201 is a circumferential groove formed in the radially outward surface of the end cap, 202 is an indented circumferential surface which will accommodate a sealing means such as an O-ring or gasket, 204 is a peripheral flange, the flange being positioned and adapted to mate against a complementary peripheral surface on the outer face of an adjacent tubesheet, and 203 is a fluid communication port extending between the inner and outer faces of the end cap.

In FIGS. 3 and 4 showing respectively a perspective view and an end view of a hollow fiber membrane tubesheet, 300 is a tubesheet body, 301 and 302 are circumferential grooves, 303 is a complementary peripheral surface which sealingly mates with the inner surface of the peripheral flange, 304 is a hollow fiber membrane bundle, 305 is a hollow fiber membrane bundle core. 306 is a hollow fiber membrane bundle, and 307 is the complementary radial sealing surface that mates with the end cap.

In FIG. 5 showing a perspective view of a collar-like segmented multiple two-part clamshell retainer means, 500 is the body of the clamshell retainer means and 501 are peripheral flanges extending radially inward, the spacing between the flanges being such as to urge each cap and associated tubesheet snugly together in a sealing relationship.

Figure 6:
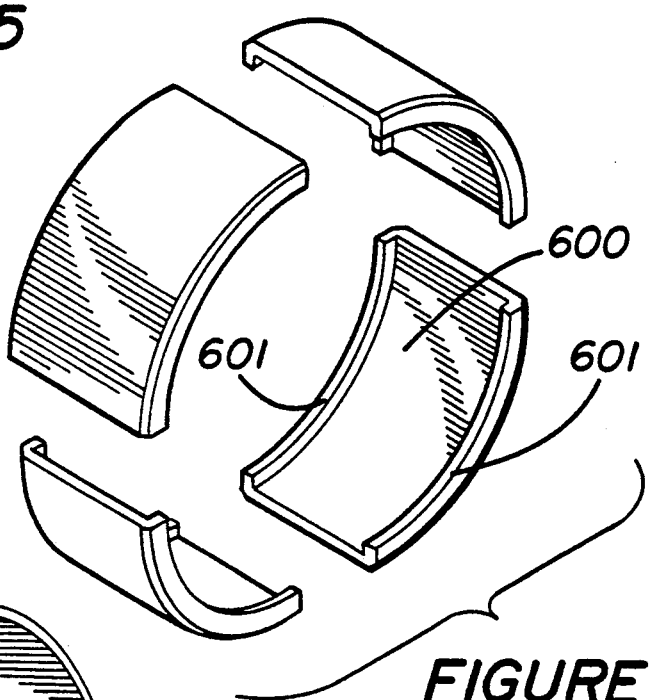
FIG. 6 is a perspective view of a collar-like four-part segmented clamshell retainer means with radially inwardly extending flanges.

In FIG. 6 showing a perspective view of a collar-like segmented multiple four-part clamshell retainer means, 600 is the body of the clamshell retainer means and 601 are peripheral flanges extending radially inward, the spacing between the flanges being such as to urge each end cap and associated tubesheet snugly together in a sealing relationship.

Figure 7:
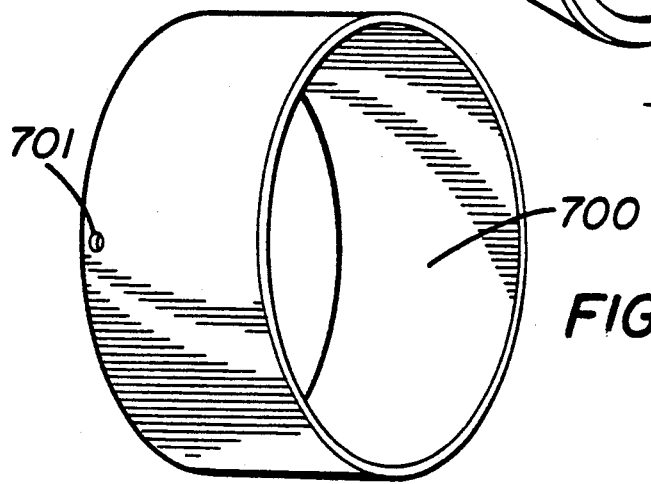
FIG. 7 is a perspective view of a circumferential keeper means in the form of a circular band of a foreshortened sleeve that is slipped over a clamshell retainer means to hold the segments in place.

In FIG. 7 showing a perspective view of a circumferential keeper means, 700 is the body of the circumferential keeper means, and 701 is a means for indexing and aligning the circumferential keeper means with the end cap such as a tapered pin or cap screw.

Figure 8:
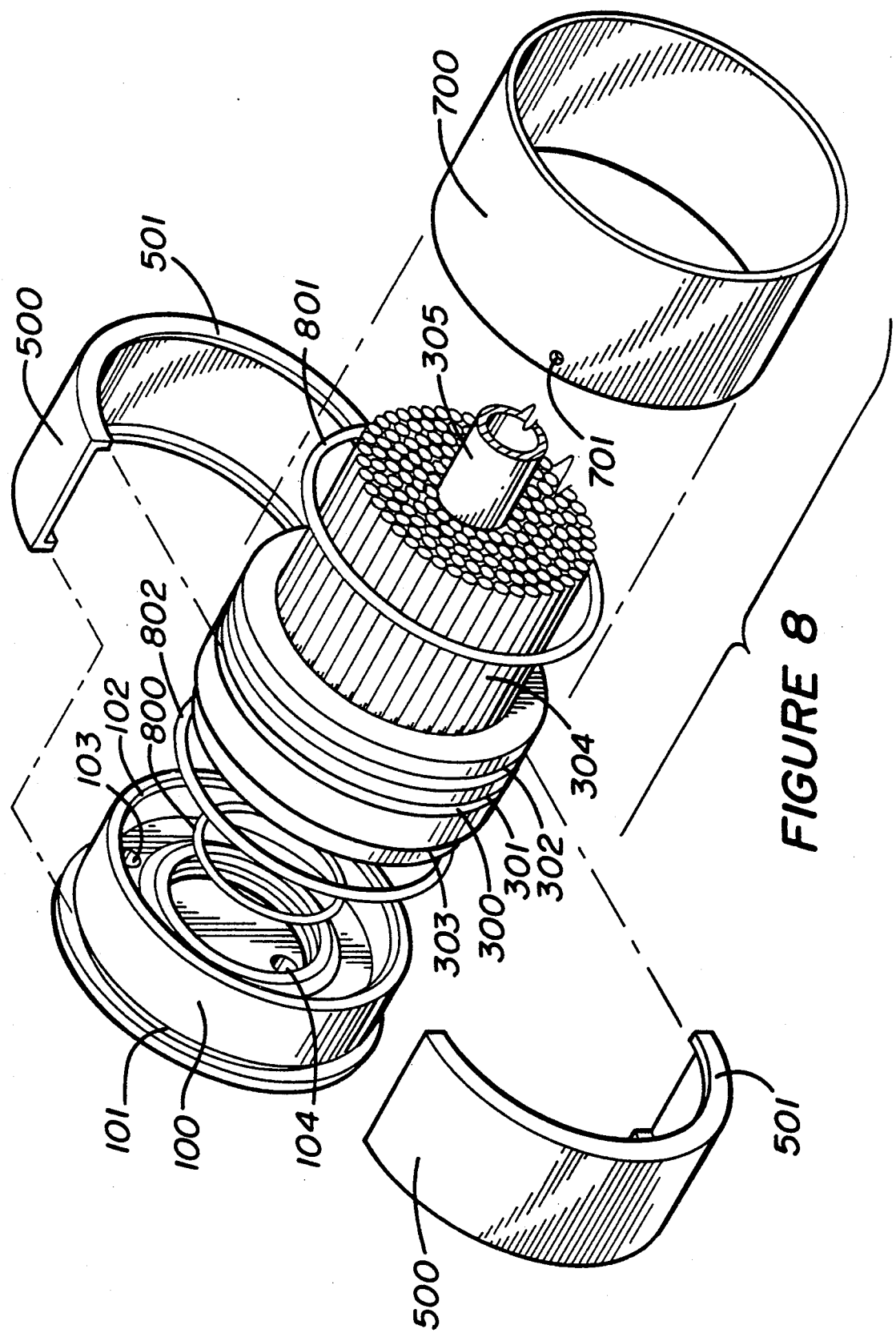
FIG. 8 is an exploded perspective view illustrating the relationship between an end cap sealingly fitted to a hollow fiber separation membrane tubesheet for a two-stage concentric module, each of the end cap and tubesheet with a peripheral groove on its outer surface, a two-part clamshell retainer means with radially inwardly extending flanges that fit into said grooves respectively, and circumferential keeper means that surrounds the clamshell retainer means and keeps the flanges thereof in said grooves.

In FIG. 8 showing an exploded perspective view of one embodiment of the invention, a housing for a two-stage concentric hollow fiber module, 100 is the feed end cap which is sealingly fitted to 300, the hollow fiber membrane tubesheet, through the use of O-rings 800 and 802. The radial surfaces of each part are of equivalent circumference and held together by 501, the peripheral flanges extending radially inward on the clamshell retainer means 500 which fit matingly and coordinately into 101, the circumferential groove in the feed end cap 100, and into 301, the circumferential groove in the hollow fiber membrane tubesheet 300. 700 is the circumferential keeper means which closely surrounds each clamshell retainer means 500 to hold the flanges of the clamshell retainer means 500 in the respective grooves in end cap 100 and associated tubesheet 300.

Figure 9:
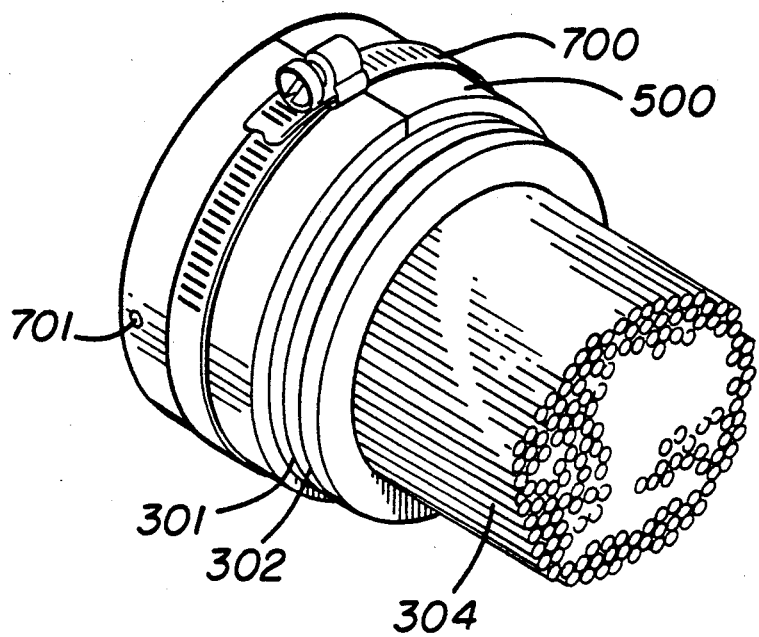
FIG. 9 is an alternative embodiment of a keeper means according to the invention.

FIG. 9 shows a perspective view of an alternative embodiment of a keeper means 700, which is an incrementally adjustable clamp. 701 is a means of indexing and aligning the clamshell retainer means 500 with the end cap 100 such as a tapered pin or cap screw.

Figure 10:
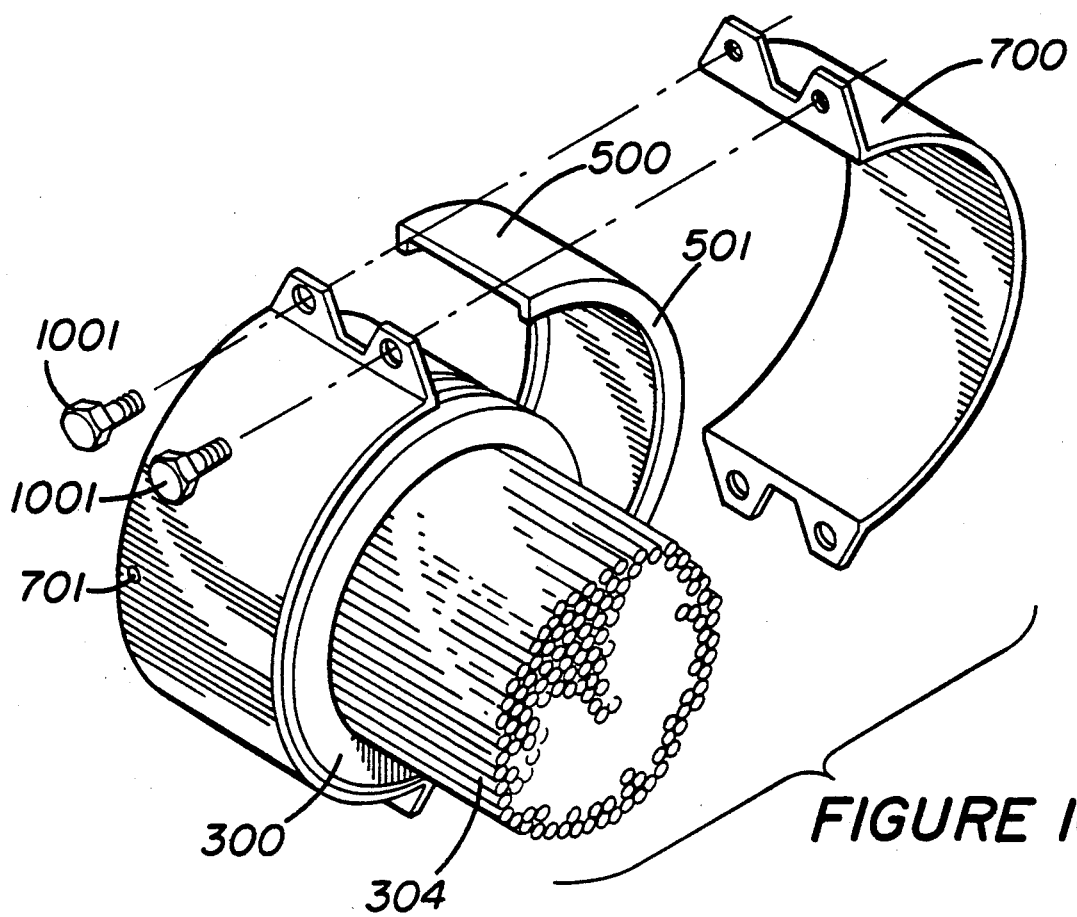
FIG. 10 is an alternative embodiment of a keeper means according to the invention.

FIG. 10 shows a perspective view of an alternative embodiment of a keeper means 700, which is a rigid multiple two-part clamp having complementary axial extensions, 1001 are cap screws which threadingly engage the axial extensions and closely surround each clamshell retainer means 500 to hold the flanges of the clamshell retainer means 500 in the respective grooves in end cap 100 and associated tubesheet 300. 701 is a means for indexing and aligning the rigid multiple two-part clamp with the end cap such as a tapered pin or cap screw.

In FIG. 11 showing a side view of a two-stage concentric hollow fiber membrane separation device, 1100 is a hollow envelope which sealingly encloses the hollow fiber membrane bundle hollow 304. 801 is an O-ring which is snugly positioned in 302, the circumferential groove in the feed end of the hollow fiber membrane tubesheet 300. 302a is the circumferential groove in the non-feed end of the hollow fiber membrane tubesheet 300a. 301 and 301a are circumferential grooves on opposing ends of the module. 303a is the complementary peripheral surface which sealingly mates with the inner surface of the peripheral flange. 306 and 306a are the membrane bundle faces on opposing ends of the module. 1101 is a fluid communication port. In the feed end of the hollow fiber membrane module, 110 is the feed inlet region. In the non-feed end of the hollow fiber membrane module, 210 is an intermediate mixing region, fluid communication port 203 being plugged. In operation, such as in a process for separating a feed gas mixture, the feed gas mixture enters the device via port 103 in the feed end cap 100, fills the feed inlet region 110 between the feed end cap 100 and tubesheet 300, and enters the bores of the hollow fiber membranes exposed along the radial face of the tubesheet. As the gas mixture flows within the bundle 304, at least one gaseous component in the gas mixture permeates through the fiber walls more rapidly than at least one other gaseous component. The non-permeate from the first stage exits the bores of the hollow fiber membranes into mixing region 210 and into the second stage, the non-permeate finally being removed from the bores of the hollow fiber membranes at 306 into the non-permeate outlet region 109, from which the non-permeate removed from the device through fluid communication port 104. The enriched permeate is removed from the outer surface of the hollow fiber membrane bundle 304 through fluid communication port 1101.

Figure 12:
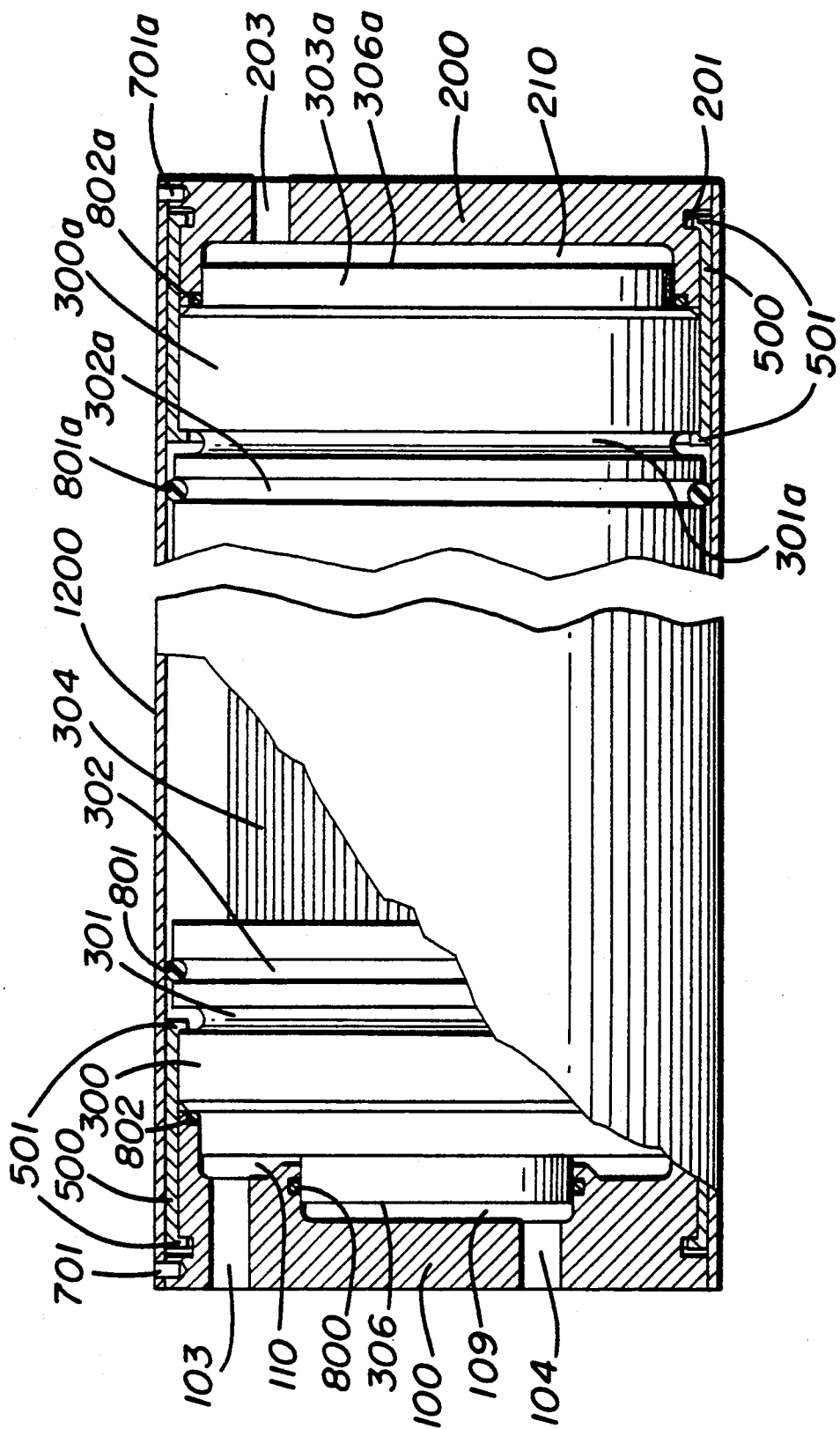
FIG. 12 is a side view partly broken away and in section of a two-stage concentric hollow fiber membrane separation device according to the invention wherein the single hollow envelope extends over the end caps and also serves as the keeper means.

In FIG. 12 showing another side view of a hollow fiber membrane separation device, 1200 is a single hollow envelope which extends over the end caps 100 and 200 and also serves as a keeper means, and which sealingly encloses the hollow fiber membrane bundle 304 and closely surrounds each clamshell retainer means 500 to hold the flanges of the clamshell retainer means 500 in the respective grooves in each end cap 100 and 200 and associated tubesheet 300 and 300a.

In any embodiment as shown in FIGS. 1, 2, 8, 11 and 12, the entrance and the exit ports for the fluid may be made contrary. With a conventional single-stage module, assembly and operation is accordingly simplified.

SPECIFIC EMBODIMENT

The following example is included for purposes of illustration only and is not intended to limit the scope of the invention or claims.

EXAMPLE

A hollow fiber membrane bundle with epoxy tubesheets was assembled using tetrabromobisphenol A polycarbonate membranes extruded in the manner described in U.S. Pat. No. 4,772,392. The membrane bundle had an active area of about 200 square meters based on the outside diameter of the hollow fibers. A device having the configuration of FIG. 11 was fabricated in accordance with the present invention. End caps were fabricated from aluminum and sealingly fitted through the use of appropriately placed O-rings to the complementary surface of each tubesheet. A cylindrical hollow envelope was fabricated from pressure-rated PVC and sealingly mounted so as to encompass the hollow fiber membrane bundle and tubesheets. Two-part clamshell retainers with peripheral radial flanges were machined from aluminum and the peripheral flanges engaged in the appropriate circumferential grooves in each end cap and adjacent associated tubesheet. A one-part cylindrical sleeve was fabricated from aluminum and mounted so as to encompass the two-part clamshell retainer. The cylindrical sleeve was held in place with a pin.

Air (comprising about 20.95 percent oxygen) at a pressure of about 135 psi (about 930.8 kPa), a temperature of about 25.8° C., and a flow rate of about 11.9 SCFM (about 336.9 L/M) was introduced into the feed port of the device. The permeate, having a composition of about 29.34 percent oxygen, was recovered at a temperature of about 25.3° C. and a flow rate of about 8.4 SCFM (about 237.8 L/M). The non-permeate inert product was recovered at a pressure of about 124.6 psi (about 859.1 kPa), a temperature of about 24.1° C., and a flow rate of about 3.5 SCFM (about 99.1 L/M). The oxygen composition of the inert product stream was found to be about 1.0 percent oxygen.

What is claimed is:

1. A process for separating a feed gas mixture using a membrane separation device containing a plurality of hollow fiber semi-permeable gas separation membranes, comprising:
   (1) contacting one side of said membranes with a feed gas mixture under pressure;
   (2) maintaining a pressure differential across the membranes under conditions such that at least one gaseous component in the feed gas mixture selectively permeates through the membranes from the higher pressure side to the lower pressure side of said membranes;
   (3) removing from the lower pressure side of said membranes permeated gas which is enriched in at least one selectively permeating gaseous component; and
   (4) removing from the higher pressure side of said membranes non-permeated gas which is depleted in at least one selectively permeating gaseous component, wherein said device comprises:
   A. a hollow fiber membrane bundle containing said plurality of hollow fiber semi-permeable gas separation membranes;
   B. a tubesheet on each end of said bundle, each tubesheet having a radially outward surface with a circumferential groove therein, an inner face intersected by said hollow fiber membranes, said hollow fiber membranes being sealingly secured at each end in the respective tubesheet and communicating therethrough, and an outer face with a peripheral surface;
   C. first and second end caps, each having a radially outward surface and an inner face with a peripheral flange, said flange being positioned and adapted to sealingly mate against the mating peripheral surface on the outer face of an adjacent respective tubesheet, each flange having sufficient width in the axial direction to provide an enclosed space between the inner face of said end cap and the outer face of the adjacent tubesheet, the space serving as a fluid inlet or outlet region, and each end cap having a circumferential groove in the radially outward surface thereof;
   D. a clamshell retainer means for each adjacent end cap and associated tubesheet, said clamshell retainer means having the configuration of a segmented collar with a plurality of segments, the segments together forming the collar with flange portions on each segment extending radially inwardly, the flange portions of each segment being adapted to fit matingly, respectively, and coordinately into the peripheral groove pair of each respective end cap and associated tubesheet, the spacing between the flanges being such as to urge each end cap and associated tubesheet snugly together in a sealing relationship;
   E. a circumferential keeper means closely surrounding each clamshell retainer means to hold the flanges of the clamshell retainer means in the respective grooves in each end cap and associated tubesheet;
   F. a hollow envelope enclosing said hollow fiber membrane bundle, said envelope having ends which are fitted sealingly against each respective tubesheet to provide an enclosed space around the hollow fiber membrane bundle; and
   G. respective ports extending through each end cap and through said keeper means and said hollow envelope to provide fluid communication into and out of said device.

2. The process of claim 1 wherein said feed gas mixture comprises at least one of the gases selected from the group consisting of hydrogen, helium, oxygen, nitrogen, carbon monoxide, carbon dioxide, water vapor, hydrogen sulfide, ammonia, and light hydrocarbons.

3. The process of claim 2 wherein the pressure of the feed gas mixture is between about 10 psig and about 2000 psig.

4. The process of claim 3 wherein the temperature of the feed gas mixture is between about 0° C. and about 150° C.

5. The process of claim 3 wherein the temperature of said membrane is between about 0° C. and about 150° C.

6. A means for attaching an end cap to a tubesheet of a hollow fiber membrane separation module, the tubesheet having an inner face intersected by a plurality of hollow fiber membranes and an outer face, the end cap and the tubesheet having mating peripheral surfaces and the end cap and tubesheet each having an outer peripheral surface, comprising:
   A. a peripheral circumferential groove in the outer surface of each of the end cap and tubesheet, the groove in the outer surface of the tubesheet being adjacent to the inner face thereof;
   B. clamshell retainer means for each adjacent end cap and associated tubesheet in the form of a segmented collar with a plurality of curved segments, the segments together forming a substantially complete cylindrical collar with flange portions adjacent to both edges thereof, the flange portions on each segment extending radially inwardly, the flange portions of each segment being adapted to fit matingly, respectively, and coordinately into the peripheral groove pair of respective end cap and associated tubesheet, the spacing between the flanges being such as to urge each end cap and associated tubesheet snugly together in a sealing relationship; and C. a circumferential keeper means closely surrounding each clamshell retainer means to hold the flanges of the clamshell retainer means in the respective grooves in each end cap and associated tubesheet.

7. A means for attaching a tubesheet of a second hollow fiber membrane separation module to a tubesheet of a first hollow fiber membrane separation module, the tubesheets each having an inner face intersected by a plurality of hollow fiber membranes and an outer face, the tubesheet of the second module and the tubesheet of the first module having mating peripheral surfaces and the tubesheet of the second module and the tubesheet of the first module each having an outer peripheral surface, comprising:

A. a peripheral circumferential groove in the outer surface of each of the tubesheets, the groove in the outer surface of the tubesheets being adjacent to the inner face thereof;

B. clamshell retainer means for the tubesheets in the form of a segmented collar with a plurality of curved segments, the segments together forming a substantially complete cylindrical collar with flange portions adjacent to both edges thereof, the flange portions on each segment extending radially inwardly, the flange portions of each segment being adapted to fit matingly, respectively, and coordinately into the peripheral grooves of the tubesheets, the spacing between the flanges being such as to urge the tubesheets together in a sealing relationship; and C. a circumferential keeper means closely surrounding each clamshell retainer means to hold the flanges of the clamshell retainer means in the grooves in each tubesheet.

8. A housing device for a hollow fiber membrane separation module having a hollow fiber membrane bundle with a tubesheet on each end of the bundle, each tubesheet having a circumferential groove in the radially outward surface, an inner face intersected by a plurality of hollow fiber membranes and an outer face, the hollow fiber membranes being sealingly secured at each end in the respective tubesheet and communicating therethrough, comprising:

A. first and second end caps, each having a radially outward surface and an inner face with a peripheral flange, said flange being positioned and adapted to sealingly mate against the mating peripheral surface on the outer face of an adjacent respective tubesheet, each flange having sufficient width in the axial direction to provide an enclosed space between the inner face of said end cap and the outer face of the adjacent tubesheet, the space serving as a fluid inlet or outlet region, and each end cap having a circumferential groove in the radially outward surface of each end cap;

B. a clamshell retainer means for each adjacent end cap and associated tubesheet, said clamshell retainer means having the configuration of a segmented collar with a plurality of segments, the segments together forming the collar with flange portions on each segment extending radially inwardly, the flange portions of each segment being adapted to fit matingly, respectively, and coordinately into the peripheral groove pair of each respective end cap and associated tubesheet, the spacing between the flanges being such as to urge each end cap and associated tubesheet snugly together in a sealing relationship; and C. a circumferential keeper means closely surrounding each clamshell retainer means to hold the flanges of the clamshell retainer means in the respective grooves in each end cap and associated tubesheet.

9. The device of claim 8 additionally comprising:

D. a hollow envelope enclosing said hollow fiber membrane bundle, said envelope having ends which are fitted sealingly against each respective tubesheet to provide an enclosed space around the hollow fiber membrane bundle; and E. respective ports extending through each end cap and through said keeper means and said hollow envelope to provide fluid communication into and out of said device.

10. The device of claim 9 wherein said clamshell retainer is comprised of non-contiguous segments.

11. The device of claim 9 wherein said clamshell retainer means is comprised of no more than two segments.

12. The device of claim 9 wherein said circumferential keeper means is comprised of a clamp of adjustable sizing.

13. The device of claim 9 wherein said circumferential keeper means is comprised of a two-part cylindria keeper, joined along one axial edge by means of a hinge and joined along the other edge by a clamping means.

14. The device of claim 9 wherein said circumferential keeper means is comprised of two cylindrical sections, joined along both axial edges by a clamping means.

15. The device of claim 9 wherein said hollow envelope serves as the circumferential keeper means.

16. The device of claim 9 wherein said circumferential grooves, said flanges extending radially inwardly from said clamshell retainer means, and peripheral interior edges of the ends of said hollow envelope are chamfered such that said clamshell retainer means and said hollow envelope are more easily assembled.

17. The device of claim 9 wherein said end cap possesses a means for indexing and aligning said circumferential keeper means.

18. The device of claim 17 wherein said indexing and aligning means is a cap screw, set screw, or pin.

19. A hollow fiber membrane separation device comprising:

A. a hollow fiber membrane bundle containing a plurality of hollow fiber semi-permeable membranes;

B. a tubesheet on each end of said bundle, each tubesheet having a radially outward surface with a circumferential groove therein, an inner face intersected by said hollow fiber membranes, said hollow fiber membranes being sealingly secured at each end in the respective tubesheet and communicating therethrough, and an outer face with a peripheral surface;

C. first and second end caps, each having a radially outward surface and an inner face with a peripheral flange, said flange being positioned and adapted to sealingly mate against the mating peripheral surface on the outer face of an adjacent respective tubesheet, each flange having sufficient width in the axial direction to provide an enclosed space between the inner face of said end cap and the outer face of the adjacent tubesheet, the space serving as a fluid inlet or outlet region, and each end cap having a circumferential groove in the radially outward surface thereof;

D. a clamshell retainer means for each adjacent end cap and associated tubesheet, said clamshell retainer means having the configuration of a segmented collar with a plurality of segments, the segments together forming the collar with flange portions on each segment extending radially inwardly, the flange portions of each segment being adapted to fit matingly, respectively, and coordinately into the peripheral groove pair of respective end cap and associated tubesheet, the spacing between the flanges being such as to urge each end cap and associated tubesheet snugly together in a sealing relationship; and E. a circumferential keeper means closely surrounding each clamshell retainer means to hold the flanges of the clamshell retainer means in the respective grooves in each end cap and associated tubesheet.

20. The device of claim 19 additionally comprising:

F. a hollow envelope enclosing said hollow fiber membrane bundle, said envelope having ends fitted sealingly against each respective tubesheet to provide an enclosed space around the hollow fiber membrane bundle; and G. respective ports extending through each end cap and through said keeper means and said hollow envelope to provide fluid communication into and out of said device.

21. The device of claim 20 wherein said clamshell retainer is comprised of non-contiguous segments.

22. The device of claim 20 wherein said clamshell retainer means is comprised of no more than two segments.

23. The device of claim 20 wherein said circumferential keeper means is comprised of a clamp of adjustable sizing.

24. The device of claim 20 wherein said circumferential keeper means is comprised of a two-part cylindrical keeper, joined along one axial edge by means of a hinge and joined along the other edge by a clamping means.

25. The device of claim 20 wherein said circumferential keeper means is comprised of two cylindrical sections, joined along both axial edges by a clamping means.

26. The device of claim 20 wherein said hollow envelope serves as the circumferential keeper means.

27. The device of claim 20 wherein said circumferential grooves, said flanges extending radially inwardly from said clamshell retainer means, and peripheral interior edges of the ends of said hollow envelope are chamfered such that said clamshell retainer means and said hollow envelope are more easily assembled.

28. The device of claim 20 wherein said end cap possesses a means for indexing and aligning said circumferential means.

29. The device of claim 28 wherein said indexing and aligning means is a set screw, cap screw, or pin.

30. The device of claim 20 wherein said hollow fiber membranes comprise at least one polymer selected from the group consisting of olefinic polymers; polytetrafluoroethylene; cellulosic esters; cellulose ethers; regenerated cellulose; polyamides; polyetherketones; polyestercarbonates; polycarbonates; polyesters; polyarylates; polyethers; polybenzoxazoles; polyoxadiazoles; polytriazoles; polycyanoarylethers; polyamideimides; polythioethers; polystyrenes; polysulfones; polyimides; polyetherimides; polyethersulfones; and copolymers and physical blends thereof.

31. The device of claim 30 wherein said hollow fiber membranes have an outside diameter in the range of about 50 microns to about 400 microns.

32. The device of claim 31 wherein said hollow fiber membranes have an outside to inside diameter ratio of between about 1.5 and about 1.15.

33. The device of claim 32 wherein the hollow fiber membranes are asymmetric.

34. The device of claim 32 wherein the hollow fiber membranes are composite.

35. The device of claim 32 wherein the hollow fiber membrane bundle is parallel-wrapped.

36. The device of claim 32 wherein the hollow fiber membrane bundle is bias-wrapped.

* * * * *